US008064691B2

(12) United States Patent
Meyer et al.

(10) Patent No.: US 8,064,691 B2
(45) Date of Patent: Nov. 22, 2011

(54) METHOD FOR IDENTIFYING COLOR IN MACHINE AND COMPUTER VISION APPLICATIONS

(75) Inventors: Frank Meyer, Milford, MI (US); Peter Smith, Ann Arbor, MI (US); Bora Tekkanat, Ann Arbor, MI (US)

(73) Assignees: Creative Lifestyle, Inc., Milford, MI (US); Vision Interface Technologies, LLC, Ann Harbor, MI (US)

( * ) Notice: Subject to any disclaimer, the term of this patent is extended or adjusted under 35 U.S.C. 154(b) by 789 days.

(21) Appl. No.: 12/107,092

(22) Filed: Apr. 22, 2008

(65) Prior Publication Data

US 2008/0285848 A1 Nov. 20, 2008

Related U.S. Application Data

(60) Provisional application No. 60/917,966, filed on May 15, 2007.

(51) Int. Cl.
*G06K 9/00* (2006.01)
*G06K 9/34* (2006.01)

(52) U.S. Cl. ........................................ 382/165

(58) Field of Classification Search .................. 382/133, 382/162, 164–167, 172, 190, 224, 260–264, 382/276–277; 358/1.13, 1.9, 3.02, 502–505, 358/515, 518, 520, 523, 525, 530; 348/223.1, 348/528, 645, E9.037; 345/589, 591, 600–604
See application file for complete search history.

(56) References Cited

U.S. PATENT DOCUMENTS

| | | | |
|---|---|---|---|
| 4,302,770 A * | 11/1981 | Hubbard et al. | 358/505 |
| 4,488,245 A | 12/1984 | Dalke et al. | |
| 4,520,386 A * | 5/1985 | Asaida | 348/528 |
| 5,237,517 A | 8/1993 | Harrington et al. | |
| 5,255,350 A | 10/1993 | Hermann et al. | |
| 5,351,141 A * | 9/1994 | Tsuji et al. | 358/520 |
| 5,493,518 A | 2/1996 | Keating | |
| 5,751,450 A | 5/1998 | Robinson | |
| 5,867,169 A | 2/1999 | Prater | |
| 6,023,524 A * | 2/2000 | Yamaguchi | 382/162 |
| 6,151,405 A * | 11/2000 | Douglass et al. | 382/133 |
| 6,185,013 B1 | 2/2001 | Harrington et al. | |
| 6,226,399 B1 | 5/2001 | Robinson | |
| 6,459,501 B1 | 10/2002 | Holmes | |
| 6,574,004 B1 | 6/2003 | Jacob et al. | |
| 6,633,407 B1 | 10/2003 | Kim et al. | |
| 6,721,000 B1 * | 4/2004 | Lin et al. | 348/223.1 |
| 6,788,811 B1 * | 9/2004 | Matsuura et al. | 382/166 |
| 7,081,920 B2 * | 7/2006 | Sugiki | 348/223.1 |
| 7,791,649 B2 * | 9/2010 | Kim et al. | 348/223.1 |
| 2004/0114166 A1 * | 6/2004 | Kubo | 358/1.9 |
| 2005/0007608 A1 * | 1/2005 | Yamamoto et al. | 358/1.9 |
| 2008/0285848 A1 * | 11/2008 | Meyer et al. | 382/165 |

* cited by examiner

*Primary Examiner* — Amir Alavi

(74) *Attorney, Agent, or Firm* — Young, Basile, Hanlon & MacFarlane P.C.

(57) ABSTRACT

A method for identifying color in a target creates a ratio color space by determining the largest color component value of each pixel in an image and creating a ratio of all of the color component value with the largest component value for each pixel. The ratio for the color component of each pixel undergoes a threshold test to identify each color component as a rich shade or a fade shade. The ratio space color components are converted to a black and white image. Color information of adjacent pixels are clumped together to form blobs of the same color. The blobs are filtered by shape, color, location, or orientation and sorted to find targets that consist of a predefined pattern with the desired characteristics.

16 Claims, 2 Drawing Sheets

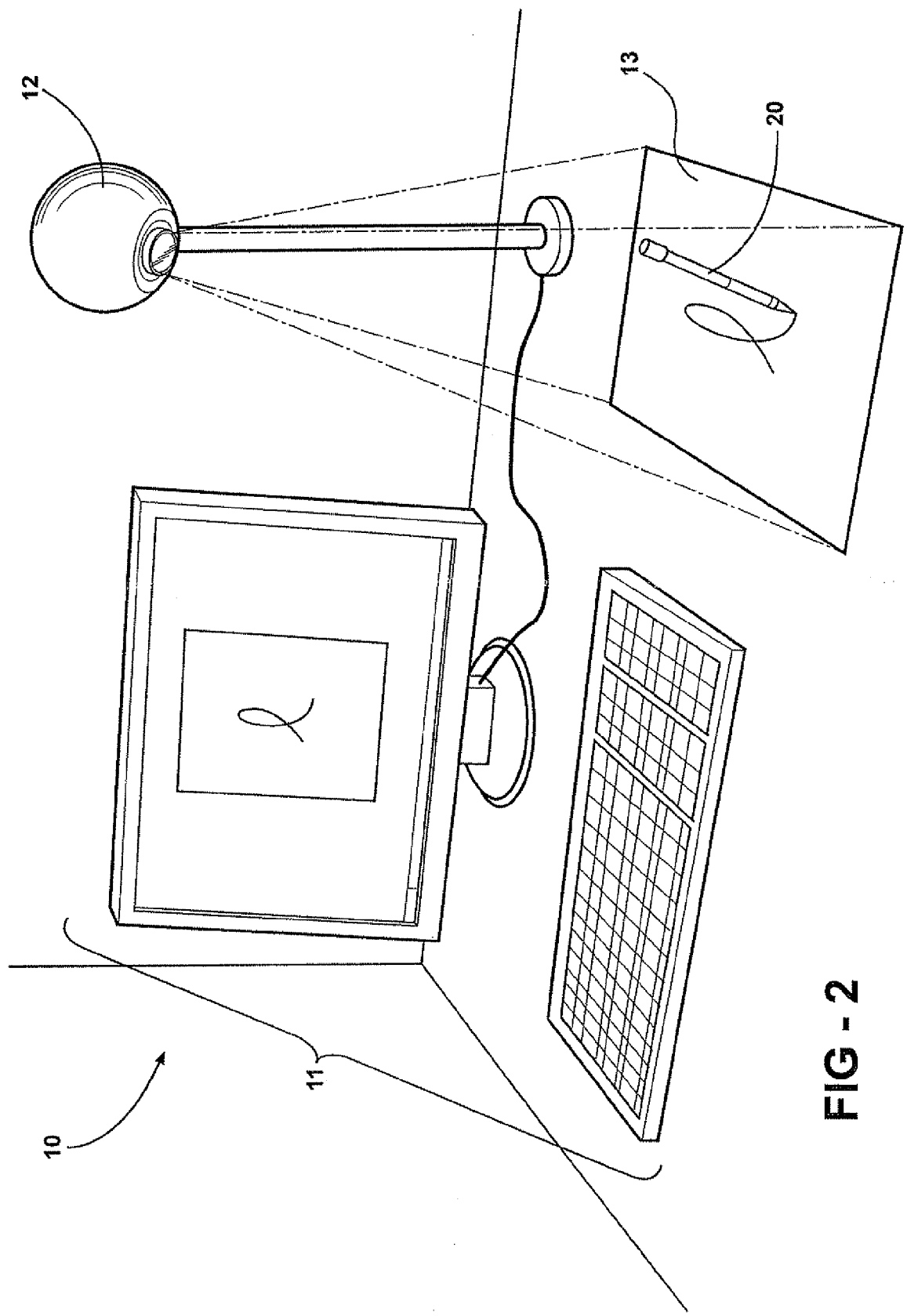

METHOD FOR IDENTIFYING COLOR IN MACHINE AND COMPUTER VISION APPLICATIONS

CROSS REFERENCE TO CO-PENDING APPLICATION

This application claims priority benefit to the filing date of co-pending U.S. Provisional Patent Application Ser. No. 60/917,966, filed May 15, 2007.

BACKGROUND

The present invention relates to a method for identifying colors in an image. The image is in the field of view of a camera or cameras and the camera is an interface to a computer for machine and computer vision applications. The invention also relates to a triggering mechanism in the field of view by identifying colors which allows the camera to be used as an interface with a computer for consumer applications.

Machine vision, commonly called automated inspection, has been used in manufacturing processes to improve productivity and quality. On a typical production line, a sensor detects a part and signals a video camera positioned above or to the side of the inspection point to capture an image and send it to a machine vision processor. Using a combination of machine vision software and hardware, the vision system analyzes the image and provides mathematical answers about the part. A traditional grayscale machine vision technology makes decisions based on 0-256 shades of gray. A typical vision algorithm segments an image into pixels that fall within an intensity band bounded by a lower and an upper threshold from the irrelevant pixels that have intensities outside of this intensity band. Alternatively they look at the rate of change of the image pixels. Once the relevant pixels have been identified, adjacent pixels are clumped together to form blobs or geometric edges and these are then characterized by geometric characteristics such as location, size, shape, etc. Inspecting colored parts or objects with grayscale machine vision system becomes usually unreliable in many cases and impossible in others. For this reason, use of a color machine vision technology is needed to inspect parts or objects in ways that could not be done using traditional grayscale machine vision systems.

Thus far, color machine vision systems have been used for three primary vision applications:

Color Matching—verifying that a certain part's or object's color matches what the vision system is programmed to find Color Sorting—sorting parts or objects based on color Color Inspection—inspecting colored parts or objects for defects or imperfections that grayscale image processing tools can't detect.

Defined as the perceptual result of visible light reflected from an object to our eyes, color represents an interpretive concept. Depending on how light is reflected, we all see colors a bit differently. Human visual system uses color to draw conclusions about surfaces, boundaries and location of objects in a scene. It takes three things to see color: a light source, a sample or an object, and a detector such as an eye or a camera. Color derives from the spectrum of light (distribution of light energy versus wavelength) interacting in the eye with the spectral sensitivities of light receptors. Typically, a wavelength spectrum from 380 nm to 740 nm (roughly) of light is detectable by human eye. This range is known as the visible light. The pure "spectral colors" from a continuous spectrum can be divided into distinct colors: violet (~380-440 nm), blue (~440-485 nm), cyan (~485-500 nm), green (~500-565 nm), yellow (~565-590 nm), orange (~590-625 nm), and red (~625-740 nm). However, these ranges are not fixed, the division is a matter of culture, taste, and language. For instance, Newton added a seventh color, indigo, as wavelengths of 420-440 nm between blue and violet, but most people are not able to distinguish it. Of course, there are many color perceptions that by definition cannot be pure spectral colors. Some examples of non-spectral colors are the "achromatic colors" (black, gray, and white) and colors such as pink, tan, and magenta.

An additive color system involves light "emitted" from a source or illuminant of some sort such as TV or computer monitor. The additive reproduction process usually uses red, green, and blue which are the "primary colors" to produce the other colors. Combining one of these primary colors with another in equal amounts produces the "secondary colors" cyan, magenta, and yellow. Combining all three primary lights (colors) in equal intensities produces white. Varying the luminosity of each light (color) eventually reveals the full gamut of those three lights (colors).

Results obtained when mixing additive colors are often counterintuitive for people accustomed to the more everyday subtractive color system of pigments, dyes, inks, and other substances which present color to the eye by "reflection" rather than emission. Anything that is not additive color is subtractive color.

Light arriving at an opaque surface is either "reflected", "scattered", or "absorbed" or some combination of these. Opaque objects that do not reflect specularly (that is, in a manner of a mirror) have their color determined by which wavelengths of light they scatter more and which they scatter less. The light that is not scattered is absorbed. If objects scatter all wavelengths, they appear white. If they absorb all wavelengths, they appear black. Objects that transmit light are either translucent (scattering the transmitted light) or transparent (not scattering the light).

The color of an object is a complex result of its surface properties, its transmission properties, and its emission properties, all of which factors contribute to the mix of wavelengths in the light leaving the surface of an object. The perceived color is then further conditioned by the nature of the ambient illumination, and by the color properties of other objects nearby; and finally, by the permanent and transient characteristics of the perceiving eye and brain.

Light, no matter how complex its composition of wavelengths, is reduced to three color-components by the eye. For each location in the visual field, the three types of color receptor cones in the retina yield three signals based on the extent to which each is stimulated. These values are sometimes called "tristimulus values".

To analyze and process images in color, machine vision systems typically use data from color spaces such as RGB, HSI (or HSL), HSV (or HSB), CIELAB (or CIEXYZ) CMYK, etc. In the RGB color space, each color appears in its primary spectral components of red, green, and blue. When combined with a three-dimensional coordinate system, the RGB color space defines quantitatively any color on the spectrum. RGB uses "additive" color mixing. X-axis specifies the amount of red color, Y-axis specifies the amount of green and the Z-axis specifies amount of blue. If RGB color model is implemented in 256 (0 to 255) discrete levels of each color component (8 bits) then the color space defines a gamut of 256×256×256 or about 16.7 million colors.

The HSI color space, also known as HSL is broken down into hue, saturation and intensity or lightness. Hue refers to pure color, saturation refers to the degree or color contrast, and intensity refers to color brightness.

HSV (hue, saturation, value), also known as SHB (hue, saturation, brightness), is quite similar to HSL "brightness" replacing "lightness". Artists often use HSV color space because it is more natural to think about a color in terms of hue and saturation.

CIE 1931 XYZ color space is the first attempt to produce a color space based on measurements of human color perception. It is the most complete color space used conventionally to describe all the colors visible to human eye. It was developed by the "International Commission on Illumination" (CIE). CIE 1976 LAB is based directly on CIE 1931 XYZ color space as an attempt to make the perceptibility of color differences linear. CIE is the most accurate color space but is too complex for everyday uses.

CMYK uses subtractive color mixing in used printing process. It is possible to achieve a large range of colors seen by humans by combining cyan, magenta, and yellow transparent dyes/inks on a white substrate. Often a fourth black is added to improve reproduction of some dark colors. CMYK stores ink values for cyan, magenta, yellow, and black. There are many CMYK color spaces for different sets of inks, substrates, and press characteristics.

Although dozens of defined color spaces exist, color machine vision applications primarily have used RGB and HSI or HSV color spaces.

Prior art systems use various techniques to measure and match colors such as discusses a color sorting method for wires by comparing the output signal of a camera to the intensity ratio of known colors until a substantial match is found.

Another technique provides a color sorting system and method used for sorting fruits and vegetables. The sorting process is handled with a look up table. The pixel value of the input image is sent to the look up table and the output from the look up table is either series of 0's (accept) or 1's (reject).

Another method for automatically and quantitatively measuring color difference between a color distribution of an object and a reference color image uses "color distance" in a color system. A template representing the reference color image is stored in a memory of a machine vision system. The machine vision system generates a sample color image of the object and processes the template together with the sample color image to obtain a total color distance.

An apparatus is known for sorting fragments of titanium-based sponge on the basis color by comparing the color values of the image to a set of data values stored in a look up table for rejection or acceptance of each fragment.

Another system and method for locating regions in a target image by matching a template image with respect to color and pattern information either by using a hill-climbing technique or fuzzy logic.

A different system and method of perceptual color identification can be used for the identification and tracking of objects, for example, in a surveillance video system. The described method includes a multilevel analysis for determining the perceptual color of an object based on observed colors. This multilevel analysis can include a pixel level, a frame level, and/or a sequence level. The determination makes use of color drift matrices and trained functions such as statistical probability functions. The color drift tables and function training are based on training data generated by observing objects of known perceptual color in a variety of circumstances.

It is clear from the prior art that traditional grayscale machine vision systems are being used successfully in a wide variety of inspection and process control applications for the electronic, automotive, food products, packaging, pharmaceutical, and recycling industries. However, the use of color machine vision systems in these industries has only been applicable to well controlled immediate environments or surroundings. It is also clear that prior art relied on matching color to a reference color image or template. A color machine and computer vision system that can make robust identification of color under varying lighting and changing image shift, scale, and rotation conditions is desirable. Machine vision systems use specialized and expensive hardware and software and therefore their use has been limited to industrial applications. With the advance of inexpensive color webcams, it is also desirable to find use for computer vision systems in cost sensitive consumer applications.

It would desirable to provide a method for identifying color in an ordinary lighting environment, to thereby obviate the prior art use of providing powered light sources in the target or in an illuminating source with specific directional or color characteristics.

It would also be desirable to provide an improved method for effectively and accurately identifying color of a target image for machine and computer vision applications under varying lighting and image conditions.

It would also be desirable to provide a method for triggering interaction or applications between a user and computer by identifying colored blobs or objects of a target image in the field of view of a camera or cameras.

It would be desirable to provide a method for tracking an object such as a pen in the field of view by identifying relative location of colored sections of this object.

It would be desirable to provide a machine or computer vision system that can be used in consumer applications by identifying color.

SUMMARY

A method of identifying color including the steps of defining a ratio color space including determining the largest color component for each pixel in an image, and dividing all of the color components values of each pixel by the largest color component value of each pixel.

The method further includes the steps of developing a filter for use with a color space including creating a threshold black and white image for one color of interest in each pixel of an image setting the threshold so that pale shades of the color of interest are separated from rich shades of the color of interest and repeating the steps for each color component in each pixel.

If any color component value for each pixel of the images is above or below the threshold, the method sets all three color components for each pixel to black; and if all color components of each pixel of the image matches the threshold, all three color components are set to white.

The method further includes the step of performing a threshold test on the ratio of space values of each pixel.

The method further includes the step of solving a distance equation in terms of ratio color components for each pixel of the target according to:

$$\text{Dist}=POS(Sr*(r-Tr))+POS(Sg*(g-Tg))+POS(Sb*(b-Tb))$$

where Sr, Sg, and Sb are scale parameters for the primary color component values r, g and b, Tr, Tg and Tb are threshold values for each of the color components r, g and b. and POS (q)=0 if q is less than or equal to 0, POS (q)=q.

In another aspect, a robust method using a computer to rapidly find the location of a colored target within an image includes one or more of the steps of as a one time step prior to processing a set of images, defining a color ratio space and creating a corresponding look-up-table for each primary color and secondary color used in a target capturing an image and subtracting from each pixel in the image the bias of each camera color component apply the ratio space look-up-table to each pixel in the image for each primary and each secondary color used in the target clumping together the adjacent color information of adjacent pixels to form blobs of the same color filtering the blobs of the same color by at least one of shape, size, location and orientation sorting all of the filtered blobs to find targets that consist of a predefined pattern formed of a set of different colored blobs with at least one of a specific size and a specific shape at relative locations and orientations to each other tracking a plurality of targets to determine one of the absolute and the relative location and to determine if any changes occurred in one of a sequence of images or compared to an ideal image and using the changes of interest introduced to the field of view as a triggering mechanism to run macros or applications or to initiate interaction between the user and the computer.

BRIEF DESCRIPTION OF THE DRAWING

The various features, advantages and other uses of the present invention will become more apparent by referring to the following detailed description and drawing in which:

FIG. 2 illustrates a computer vision system that performs color tracking.

DETAILED DESCRIPTION

Figure 1:
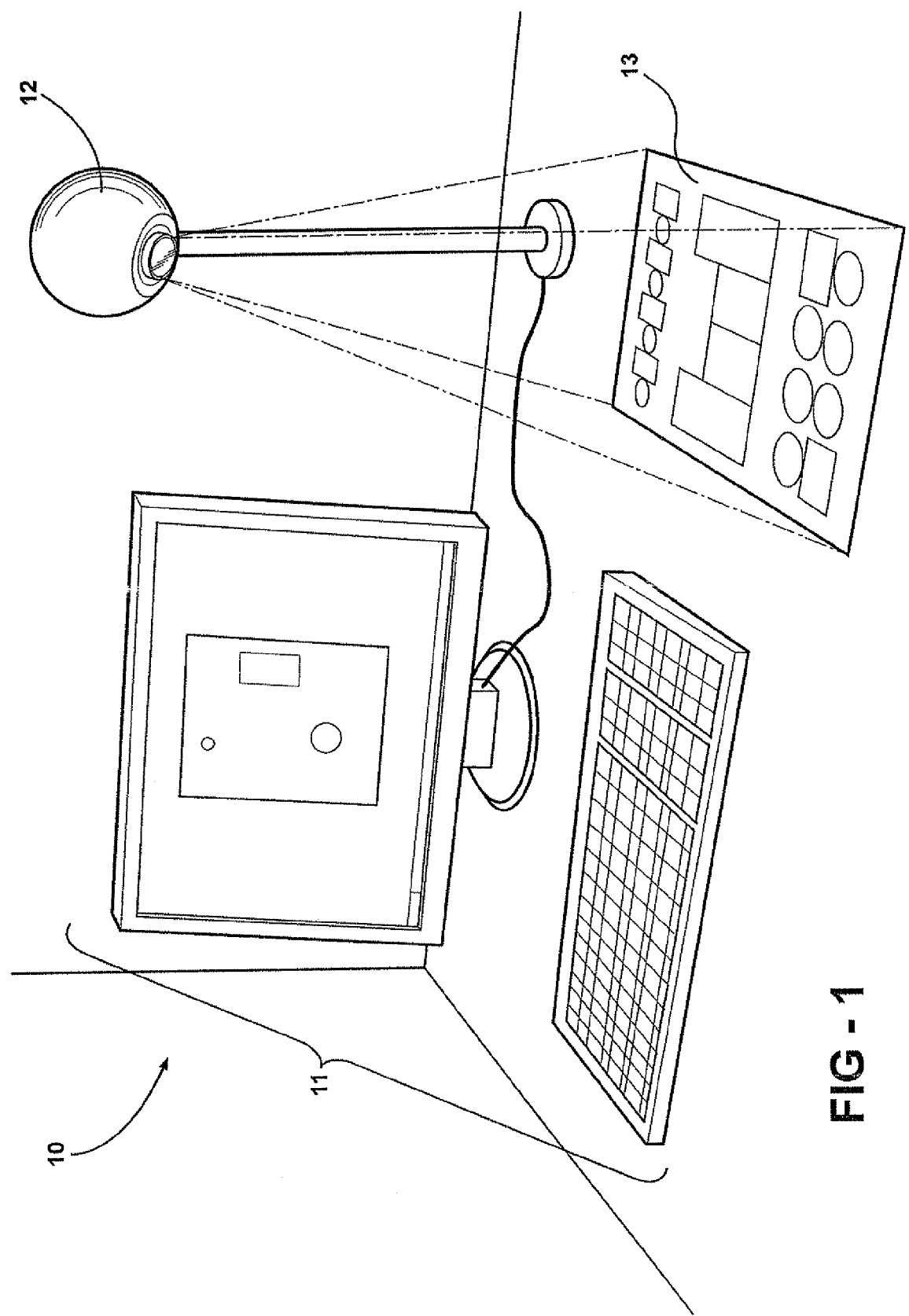
FIG. 1 illustrates a computer vision system which performs color identification.

FIG. 1 illustrates one aspect of a computer vision system 10 that performs color identification. The computer vision system 10 may include a computer system 11, a color camera 12, such as a webcam, and a field of view 13.

The computer system 11 may include one or more processors, a memory medium, monitor, and input devices, such as a keyboard and mouse and any other components necessary for a computer system. The computer system 11 also includes one or more software programs operable to perform color identification function. The software programs may be stored in a memory medium, such as a DRAM, SRAM, EDO RAM, etc., or a magnetic medium such as a hard drive, DVD, CD, or floppy disk. The computer system 11 is broadly defined to encompass any device, having a processor which executes instructions from a memory medium, such as a personal computer, workstation, mainframe computer, network appliance, internet appliance, personal digital assistant (PDA), cell phone, ipod, etc.

The color camera 12 can be an inexpensive webcam. The color camera 12 may comprise an image sensor such as a "Charged Coupled Device" (CCD) or "Complementary Metal Oxide Semiconductor" (CMOS). The color camera 12 may be connected to the computer system 11 USB port either through a wire or wirelessly. The color camera 12 may be attached to a flexible stand or clipped on a monitor to point at a particular field of view 13. The output of the color camera 12 is usually the values in 256 discrete levels of each of three color-components, red, green and blue (R, G, B), for each pixel of a target image in the field of view 13. The pixel-by-pixel color information of the target image is fed to the computer system 11 for each frame and this information is repeated on a continuous basis depending on the refresh rate of the color camera 12. The way the color information is processed by the software program of the computer system 11 is explained in details below.

The color identifying method can identify six (three factorial) colors; red, green, blue, yellow, cyan, or magenta with the use of three-component color camera 12 as well as black and white for a total of eight colors. With the advance of the four-component color cameras, 24 (four factorial) colors or a total of 26 colors including black and white can be identified. The present method identifies the colors of interest on a target image accurately under varying light and image conditions.

As a first step, the method receives the output information of the camera expressed in (R, G, B) values of color components of each pixel. The largest color component is then identified and all three color-components (R, G, B) are divided by this value. It is important to note that the largest color component may be different from pixel to pixel and is not an overall or fixed maximum. In this way, the present method creates a new color space called "Ratio Space". The components of the ratio space (r, g, b) are such that the largest component is always 1.0 and the other two components may be 0 or 1.0 or a value between 0 and 1.0.

From this point on, the method processes the color information from each pixel in ratio space values (r, g, b). Next, the ratio space values (r, g, b) are put to a "Threshold Test". If the values pass the threshold test then the information is identified as a "rich" shade of the color of interest. The present method departs from the prior art in that the prior art tries to identify every shade of a color on the target image by matching that color to an elaborate library of reference color images or templates. The improved method effectively and accurately identify "rich" shades of a color of a target image from the "pale" shades of a color under varying light and image conditions. Once the relevant pixels are identified as "rich" shades, the adjacent pixels are clumped together to form blobs and these blobs are then filtered by geometric characteristics such as shape, size, location, orientation, etc.

The method then keeps track of the information of a target image from one frame to the next. Any changes in the target image from one frame to the next or succession of frames can be used as an interaction between the user and computer. This interaction can be in the form of performing certain tasks or initiating applications or feedback, thus making the camera a convenient interface for the user. Thus, the first step in tracking is filtering out of the clutter of the target image all but a specific rich color. Next, this simple image is filtered to find blobs of this color with specific shape and size. This step is repeated for other specific rich colors. And finally, a target or set of targets of that are geometrically related to each other can simply be identified and used to trigger a computer action.

The threshold test is carried out in a "Distance" equation defined below. The distance equation converts color information from each pixel, in ratio space values (r, g, b), to "achromatic" color information (black, gray, or white) between 0 and 255 or more preferably to "binary" information black or white (0 or 255). The method creates a "Filter" by combining the threshold test into the distance equation and accomplishes to reduce the color information of a target image into a binary output, black or white. Black represents the color information that passed the threshold test as a "rich" shade of a color of interest or "target" and white represents the color information that failed the threshold test as a "fade" shade of a color or "unidentified" color. Thus, with a three-component color camera, the method can separate a target image into 6 regions of distinct colors.

The distance equation employs a "Scale Parameter" (S). The scale parameter is usually a very large number and set to a "negative" value for the primary component(s) of the color of interest so that it operates in the opposite direction to the "Threshold Value" (T). The distance equation also employs a function called POS (q) and POS (q)=0 if q≦0 else POS (q)=q. The distance equation is defined as follows in ratio space color component values (r, g, b):

$$Dist=POS(Sr*(r-Tr))+POS(Sg*(g-Tg))+POS(Sb*(b-Tb))$$

The preferred threshold values and scale parameters for 6 colors of interest are as follows:

RED: Tr=1.0, Tg=0.8, Tb=0.8 Sr=−1000, Sg=1000, Sb=1000

GREEN: Tr=0.8, Tg=1.0, Tb=0.8 Sr=1000, Sg=−1000, Sb=1000

BLUE: Tr=0.8, Tg=0.8, Tb=1.0 Sr=1000, Sg=1000, Sb=−1000

YELLOW: Tr=0.95, Tg=0.95 Tb=0.8 Sr=−1000, Sg=−1000, Sb=1000

MAGENTA: Tr=0.95, Tg=0.8, Tb=0.95 Sr=−1000, Sg=1000, Sb=−1000

CYAN: Tr=0.8, Tg=0.95, Tb=0.95 Sr=1000, Sg=−1000, Sb=−1000

The method can also determine the achromatic colors such as black and white when all three color components in ratio space (r, g, b) are 1.0 or nearly 1.0, if so by looking at the original (R, G, B) values being (large) above a white threshold or (small) below a black threshold.

For a given pixel of color information, if the output of the distance equation is 0 then that color passes the threshold test, if the output of the distance equation is anything but 0 then that color fails the threshold test.

The following example demonstrates how distance equation filters the color information from the camera output to binary color information:

EXAMPLE 1

Consider Two Pixels with the Following Components:

Pixel 1: (R, G, B)=210, 50, 40 and Pixel 2: (R, G, B)=210, 190, 80

In ratio space values: Pixel 1: (r, g, b)=1.0, 0.238, 0.190 and Pixel 2: (r, g, b)=1.0, 0.904, 0.381 then the distance equation for the Pixel1 and Pixel2 become:

$$Dist\ 1=POS(-1000*(1.0-1.0))+POS(1000*(0.238-0.8))+POS(1000*(0.190-0.8))=0+0+0=0$$

$$Dist\ 2=POS(-1000*(1.0-1.0))+POS(1000*(0.904-0.8))+POS(1000*(0.381-0.8))=0+10.4+0=10.4$$

The result of distance equation is "0" i.e. the Pixel 1 passes the threshold test and is identified as a rich shade of red and the output of the filter is set to black. On the other hand, Pixel 2 does not pass the threshold test and is categorized as a fade or pale shade or unidentified color, therefore, the output of the filter is set to white (i.e. 255).

There are several ways for defining a filter and setting threshold values. For example, a pixel representing a green color might register the following values in the ratio space: (r, g, b)=0.45, 1.0, 0.55. A filter can be constructed such that anything with Tr≧(1.45/2) or Tg≦1.0 or Tb≧(1.55/2) is rejected by the filter. This threshold is called the "half-distance-value" to the primary color component (1.0).

The method can be enhanced to handle cameras that are not calibrated correctly for the ambient lighting. This requires a preprocessing phase that consists of the following steps: First, identifying the component bias of each color component (R, G, B). This can be done by red, green, blue targets or a set of known black blobs and identify the lowest component values of each of these colors. Subtract each of these three values from their corresponding component in each pixel of the entire image. Second, multiply each R, G, B value of every pixel in the image by a single scale factor so that the entire image brightness is enhanced to compensate for the brightness that was subtracted. For the ratio signature space this step is unnecessary since the ratio cancels out any factor that is common in both the numerator and the denominator.

To provide successful commercial applications in color identification, the method should be very robust in every lighting condition. A field of view might be under direct sunlight or in a shadowy room or under incandescent lights during evening, etc. The strength of the method in identifying color particularly in challenging lighting environments comes from the "Ratio Space". The ratio space has an impact on finding targets and colored objects in a typical environment for commercial and consumer applications. The following example illustrates this point:

EXAMPLE 2

The camera output might register (R, G, B)=0.6, 0.8, 92.8 and (r, g, b)=0.006, 0.008, 1.0 for a blue spot over a sunny part of the field of view or (R, G, B)=3.2, 14.3, 63.5 and (r, g, b)=0.05, 0.225, 1.0 over a shadowy region of the field of view. The camera output for a red spot might register (R, G, B)=99.6, 0.4, 0.4 and (r, g, b)=1.0, 0.004, 0.004 over a sunny part of the field of view or (R, G, B)=64.7, 17.8, 4.6 and (r, g, b)=1.0, 0.275, 0.07 over a shadowy region of the field of view. While the original (R, G, B) values might fluctuate significantly from sunny regions to shadowy spots of the field of view, the ratio space values make it easy to identify the color of interest.

Another advantage of the present method in identifying color is the ability to optimize the "camera parameters" for varying lighting conditions. Camera parameters such as: gain, brightness, contrast, saturation, sharpness, white balance, backlight compensation, etc. can be optimized for a given field of view and the accompanying lightning conditions. The method accomplishes this optimization by going through a calibration process for a known field of view as a preprocessing step. Once the camera parameters are optimized for a given field of view, the method is ready to launch.

The field of view 13 for the present method can be anything that the camera 12 is pointing at. The camera 12 can be pointing at a desktop such as in FIG. 1, and in this case, the field of view 13 can be a plain sheet of paper, a book, an object, etc. The camera 12 can be pointing at a person or people in front of the computer, or a scene with items or objects in it. The field of view 13 can be a screen or whiteboard that the camera 12 is pointing at. Further, the target image that is processed by this method can be the entire field of view or part of the field of view such as an "area of interest". For example, not every item or object in the field of view might be changing from one frame to the next. In this case, the target image might focus on the section of the field of view that might be an area of interest.

It should be by now obvious to one skilled in the art that the present method can be used in a variety of consumer and commercial applications. One aspect of creating consumer friendly applications using the method is the ability to identify color effectively under varying lighting conditions in the field of view of a camera. The monitoring and tracking changes in the field of view of a camera lead to potential uses not only in traditional machine vision applications but also open up consumer applications with the use of inexpensive webcams.

FIG. 2 illustrates a computer vision system that performs color tracking according to one aspect of the present method. An application of the present method is given in FIG. 2 as an example for tracking an object 20, such as a pen, in the field of view by identifying relative locations of colored sections of this object. Tracking of simple objects such as a pen or finger in a field of view can be used as an alternate input device for computer aided design and drawing CAD) applications.

What is claimed is:

1. A method of identifying color comprising the steps of:
    using at least one processor to perform the steps of:
        defining a ratio color space including determining the largest color component value for each pixel in an image; and
        dividing all of the color component values of each pixel by the largest color component value of each pixel.

2. The method of claim 1 further comprising the step of developing a filter for use with a color space including the step of:
    creating a threshold black and white image for one color of interest in each pixel of an image;
    setting the threshold so that pale shades of the color of interest are separated from rich shades of the color of interest; and
    repeating the steps for each color component in each pixel.

3. The method of claim 2 further comprising the steps of:
    if any color component for each pixel of the images is above or below the threshold, setting all three color components for each pixel to black; and
    if all color components of each pixel of the image matches the threshold, setting all three color components for each pixel to white.

4. The method of claim 1 further comprising the step of:
    performing a threshold test on the ratio of space values of each pixel.

5. The method of claim 4 further comprising the steps of:
    if any color component for each pixel of the images is above or below the threshold, setting all three color components for each pixel to black; and
    if all color components of each pixel of the image matches the threshold, setting all three color components to white.

6. The method of claim 4 further comprising the step of:
    converting the color information for each pixel, in ratio space values, to achromatic color information.

7. The method of claim 6 further comprising the steps of:
    reducing the color information of a target image into black and white, with black representing color information that passed the threshold test as a rich shade of a color of interest and white representing the color information that failed the threshold test as a fade shade of a color of interest.

8. The method of claim 6 wherein the converting step further comprises:
    employing a scaled parameter for each primary component of a color of interest.

9. The method of claim 8 wherein the step of employing a scaled parameter further comprises the step of:
    setting the scale parameter to a negative large value for primary components for the color of interest.

10. The method of claim 9 wherein the converting step further comprises the step of:
    solving a distance equation in terms of ratio color components for each pixel of the target according to:

$$Dist = POS(Sr*(r-Tr)) + POS(Sg*(g-Tg)) + POS(Sb*(b-Tb))$$

where Sr, Sg, and Sb are scale parameters for the primary color component values r,g and b, Tr,Tg and Tb are threshold values for each of the color components r,g and b; and POS (q)=0 if q is less than or equal to 0, POS (q)=q.

11. The method of claim 1 wherein color component values are included in RGB color space.

12. A robust method for rapidly finding the location of a color target within an image, the method comprising one or more of the steps of:
    using at least one processor to perform the steps of:
        as a one time step prior to processing a set of images, defining a color ratio space and creating a corresponding look-up-table for each primary color and secondary color used in a target;
        capturing an image and subtracting from each pixel in the image the bias of each camera color component;
        applying the look-up-table to each pixel in the image for each primary and each secondary color used in the target;
        clumping together the adjacent color information of adjacent pixels to form blobs of the same color;
        filtering the blobs of the same color by at least one of shape, size, location and orientation;
        sorting all of the filtered blobs to find targets that have of a predefined pattern formed of a set of different colored blobs with at least one of a specific size and a specific shape at relative locations and orientations to each other;
        tracking a plurality of targets to determine one of the absolute and the relative location and to determine if any changes occurred in one of a sequence of images and compared to an ideal image; and
        using the changes of interest introduced to the field of view as a triggering mechanism to perform one of running macros and applications and initiating interaction between the user and the processor.

13. A method for identifying color information of a target image in a field of view of a camera on a pixel by pixel basis, the method comprising the steps of:
    using at least one processor to perform the steps of:
        receiving the color information of camera output in three color component values for each pixel of the target image;
        defining a ratio color space by determining the largest value of the three color component values and dividing the three components value by the largest value for each pixel;
        defining the components of the ratio space such that the largest component value is always 1.0 and the other two components are any of 0, 1.0, and a value between 0 and 1.0;
        putting the ratio space values of each pixel to a threshold test;
        identifying the color information of each pixel as one of rich shade of the color of interest if it passes the threshold test and as a fade shade of the color of interest if it fails the threshold test;
        filtering the color information of each pixel into a binary black and white outputs, with black representing color information that passed the threshold test as a rich shade of a color of interest and white representing color information that failed the threshold test as a fade shade of a color;

clumping together the black outputs into black blobs for each color of interest in a white matrix of the target image;

sorting the black blobs of the same color by at least one of shape, size, location and orientation as targets and generating a plurality of distinct black and white outputs of the target image for each colored of red, green, blue, yellow, cyan, and magenta; and identifying the information targets may carry with respect to each other at least one of color, shape, size, location and orientation.

14. A method of identifying color in a color space comprising the steps of:

using at least one processor to perform the steps of:
determining the largest color component for each of a plurality of pixels of an image;
subtracting each color component value in each pixel from the largest color component value; and
normalizing the resulting values.

15. The method of claim 14 wherein the normalizing step further comprises the step of:
multiplying each color component value by a scale factor.

16. The method of claim 14 wherein each color component value is included in RGB color space.

* * * * *